United States Patent Office 3,435,049
Patented Mar. 25, 1969

3,435,049
NITROIMIDAZOLE DERIVATIVES
Max Hoffer, Nutley, N.J., assignor to Hoffmann-La Roche Inc., Nutley, N.J., a corporation of New Jersey
No Drawing. Filed May 19, 1965, Ser. No. 457,212
Int. Cl. C07d *49/36, 99/02;* A01n *9/02*
U.S. Cl. 260—309       2 Claims

ABSTRACT OF THE DISCLOSURE

Antitrichomonal 1-(3-halo-2-hydroxypropyl) - 5-nitroimidazole derivatives are prepared inter alia by reacting 4,5-nitroimidazole or a 2-lower alkyl or 2-halo derivative thereof with bis (3-halo-2-hydroxypropyl) sulfate.

---

This invention relates to a new class of nitroimidazoles and to the method of preparing same. More particularly, it relates to 4(or 5)-nitroimidazoles of the formula

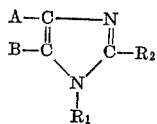

wherein $R_1$ represents the group

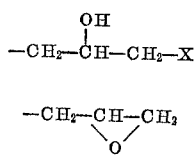

and X is halogen, i.e., chlorine, bromine, iodine or fluorine; $R_2$ represents hydrogen, halogen or lower alkyl; and wherein one of A and B represents a nitro group and the other represents hydrogen or iodine.

Thus, the invention embraces compounds of the formula

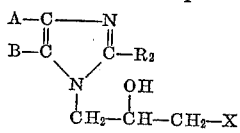

wherein A, B and $R_2$ have the same significance as above and X represents halogen as well as compounds of the formula

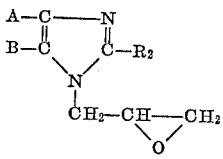

wherein A, B and $R_2$ have the same significance as above.

As used throughout this disclosure, the term "lower alkyl" comprehends both straight and branched chain alkyl radicals preferably those containing from 1–7 carbon atoms such as methyl, ethyl, propyl, isopropyl, butyl and the like. The term "halogen" comprehends all four halogens, i.e., chlorine, bromine, iodine and fluorine with the middle halogens, i.e., bromine and chlorine, constituting a preferred group.

The novel compounds of this invention are prepared by reacting a 4(5)-nitroimidazole, a 2-lower alkyl-4(5)-nitroimidazole or a 2-halo-4(5)-nitroimidazole with epihalohydrin at an elevated temperature preferably a temperature in the range of about 80° to about 120° C. The reaction is preferably carried out in the presence of a basic catalyst. As catalysts one may use, for example, salts of alkali metals, e.g., sodium acetate, potassium carbonate and the like, or an alkali metal salt of 2-methyl-4(5)-nitroimidazole. The reaction is conveniently carried out by using an excess of epihalohydrin as solvent though any inert organic solvent could be employed. The preferred epihalohydrin is epichlorohydrin. By this method there are obtained mixtures of 4- and 5-nitroimidazoles of the formulas

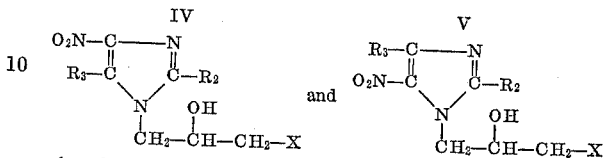

wherein $R_2$ and X are the same as above and $R_3$ is hydrogen or iodo.

In the case where $R_3$ is iodo, the mixture was readily separated into the two components. However, in the case where $R_3$ is hydrogen, only the 4-nitroimidazoles could be isolated.

Upon treating the compounds of Formula IV or V above with alkali, one can obtain the corresponding epoxides of the formulas

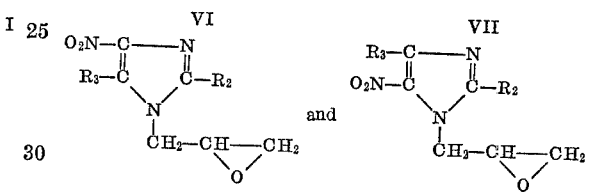

wherein $R_2$ and $R_3$ are the same as above.

The treatment with alkali is conveniently carried out at room temperature though temperatures above or below room temperature may also be utilized. Any strong base such as sodium hydroxide, potassium hydroxide, etc. can be used. The reaction is suitably effected in an inert organic solvent preferably an alcohol.

The 5-nitroimidazoles corresponding to compounds of Formula VII above are obtained by reacting 4(5)-nitroimidazole or the 2-lower alkyl or 2-halo derivatives thereof with bis(3-halo-2-hydroxypropyl)sulfate followed by treatment with a strong base such as NaOH, KOH, etc. Acidification with hydrohalic acid, for example, with hydrochloric acid gives the isomeric 5-nitro compounds corresponding to compounds of Formula V. The reaction with bis(3-halo-2-hydroxypropyl)sulfate is preferably carried out at an elevated temperature, conveniently a temperature between about 120 and 140° C. The acidification is readily effected at room temperature or above or below room temperature by simply adding the acid.

The 4(5)-iodo-2-lower alkyl-5(4)-nitroimidazoles of this invention which are used as intermediates in the preparation of the corresponding 4-iodo-5-nitro and 5-iodo-4-nitro end products are also novel compounds. They are prepared from 4,5-diiodo-2-lower alkyl imidazoles by nitration which unexpectedly results in replacement of one of the iodo substituents by a nitro group. As nitrating agent there can be employed a mixture of concentrated sulfuric acid and nitric acid. The nitration reaction is suitably effected below room temperature, preferably below about 10° C. The iodo group in either the 4- or 5-position of the 4-iodo-5-nitro and 5-iodo-4-nitro compounds obtained as above can in turn be exchanged for a lower alkoxy group by simply treating with an alkali metal alkoxide, e.g., sodium methylate, etc.

The novel compounds of Formulas IV and V can, if desired, be converted into salts by reacting a suitable acid. Suitable acids are, for example, the strong acids such as hydrohalic acid. Pharmaceutically acceptable salts are prepared from pharmaceutically acceptable acids.

The novel end products of this invention are useful as chemotherapeutic agents. In particular, they are useful in the treatment of infections due to pathogenic protozoa such as certain species of amoebae, more specifically, as trichomonacides, such as, for example, against *Trichomonas vaginalis*. The 5-nitro isomers have been found to be particularly effective as trichomonacides. The novel compounds of this invention can be administered systemically, for example, orally, with dosage adjusted to individual requirements. They can be administered in conventional pharmaceutical forms or in admixture with conventional organic or inorganic pharmaceutical carriers suitable for oral administration such as starches, lactose, sucrose, gelatin, magnesium stearate, talc, vegetable oils, gums and the like. They can also contain other therapeutically valuable substances or they can contain pharmaceutical adjuvants such as preservatives, stabilizing agents, wetting agents, emulsifying agents and the like. The pharmaceutical preparations can be in convention solid forms such as tablets, capsules, lozenges and the like and in conventional liquid forms such as suspensions, emulsions and the like. They can be submitted to conventional pharmaceutical expedients such as, for example, sterilization, etc.

The invention will be more fully understood from the examples which follow. These examples are to be construed as illustrative of the invention and not limitative thereof. All temperatures are stated in degrees centigrade and all melting points are corrected.

EXAMPLE 1

Preparation of 1-(3-chloro-2-hydroxypropyl)-2-methyl-4-nitroimidazole 300 ml. of epichlorohydrin, 50 g. of 2-methyl-4(or 5)-nitroimidazole and 0.5–1 g. of 2-methyl-4(or 5)-nitroimidazole sodium were heated under stirring and reflux to 110–118° for 10 minutes. Upon chilling the product crystallized and was recovered by suction filtration. The mother liquor was vacuum distilled from a hot water bath to recover excess epichlorohydrin and an additional crop of the product was recovered by recrystallization of the residue from alcohol. The melting point of the product is 150–151°.

EXAMPLE 2

Preparation of 1-(2,3-epoxypropyl)-2-methyl-4-nitroimidazole 1.2 g. of potassium hydroxide was dissolved in 10 ml. of water. 4 g. of 1(-3-chloro-2-hydroxypropyl)-2-methyl-4-nitroimidazole was added at 10–20° and the mixture slurried at 20–25° for 30 minutes. The mixture was then heated to 50–70° for one minute and chilled. The product crystallized and was recovered by filtration. Recrystallized from ethyl acetate the product melted at 90–91°.

EXAMPLE 3

Preparation of 1-(2,3-epoxypropyl)-2-methyl-5-nitroimidazole 50 g. of 2-methyl-4(or 5)-nitroimidazole and 125 g. of bis-(3-chloro-2-hydroxypropyl)sulfate were heated under stirring to 125–135° for 3 hours. The resulting homogeneous syrup was allowed to cool and dissolved in 80 ml. of water below 40°. The solution was chilled to 10–15° and an aqueous sodium hydroxide solution, 150 ml. 3 N, and methylene chloride, 200 ml., were added simultaneously at 10–20°. The layers were separated, the aqueous layer extracted once more with 100 ml. of methylene chloride and the combined methylene chloride layers washed repeatedly with 3 N aqueous sodium hydroxide solution. The methylene chloride was removed by evaporation in vacuo and the residue slurried with ether for crystallization. The product recrystallized from water or ethyl acetate formed practically colorless prisms melting at 110–111°.

EXAMPLE 4

Preparation of 1(3-chloro-2-hydroxypropyl)-2-methyl-5-nitroimidazole 5 g. of 1-(2,3-epoxypropyl)-2-methyl-5-nitroimidazole was added to 30 ml. of concentrated aqueous hydrochloric acid. The solution was heated to the boiling point for 20 minutes, chilled, diluted with 30 ml. of water and carefully neutralized with ammonia to a pH of 7–8. It was then saturated with ammonium sulfate. The precipitated oil crystallized after several days. Recrystallized from toluene, there was obtained the 1-(3-chloro-2-hydroxypropyl)-2-methyl-5-nitroimidazole product melting at 77–78°.

In like manner there was obtained 1-(3-bromo-2-hydroxypropyl)-2-methyl-5-nitroimidazole as a heavy oil. The picrate of this compound crystallized and melted at 137°.

EXAMPLE 5

Preparation of 4(or 5)-iodo-2-methyl-5(or 4)-nitroimidazole 70 g. of 2-methyl-4,5-diiodoimidazole was added in small portions to a mixture of concentrated sulfuric acid (140 ml.) and nitric acid (d.=1.5) (140 ml.) at −10 to 10° under stirring. The solution was allowed to reach room temperature and then stirred at 20–25° for 2 hrs. It was poured into ice (500–1000 g.) and conc. ammonia (300 ml.) was added under stirring and cooling. The precipitate was filtered by suction and slurried with sodium iodide solution (200 ml., 10 percent) to remove iodine. It was filtered again, washed with water, slurried with cold alcohol (50–100 ml.) and filtered again by suction to obtain the product melting at 271–273° under decomposition.

EXAMPLE 6

Preparation of 1(3-chloro-2-hydroxypropyl)-5-iodo-2-methyl-4-nitroimidazole 100 g. of 4(or 5)-iodo-2-methyl-5(or 4)-nitroimidazole, 400 ml. of ethanol and 80 g. of epichlorohydrin were refluxed under stirring for 12 hours until a clear solution had resulted. The mixture was poured into 1.5 liters of water and stirred for 3–4 hours. The semicrystalline precipitate was filtered and slurried twice with a mixture of 100 ml. ethyl acetate and 1 ml. abs. ether. The sandy crystalline yellow product melted at 142°.

EXAMPLE 7

Preparation of [1-(3-chloro-2-hydroxypropyl)-4-iodo-2-methyl-5-nitroimidazole]

To the aqueous alcoholic mother liquor of the preceding example there was added 150–200 g. of ammonium sulfate and the solution extracted twice with ethyl acetate using 250–300 ml. each time. The ethyl acetate extract was combined with the ethyl acetate-ether wash of the previous example and the solvent removed by evaporation in vacuo from a steambath. The syrupy residue was taken up in 100 ml. of methanol and 100 ml. of concentrated hydrochloric acid was added. After several minutes the hydrochloride of the 4-nitro-compound crystallized and was removed by filtration. The filtrate was diluted with 500 ml. of water and neutralized with aqueous ammonia to a pH of 6–7. Upon seeding the product crystallized and was collected by filtration. Recrystallization from ethanol gave the product having a melting point of 136–137°.

EXAMPLE 8

Preparation of 1(2,3-epoxyproyl)-2-methyl-4-nitro-5-iodoimidazole 55 g. of α-chloromethyl-5-iodo-2-methyl-4-nitro-1-imidazole ethanol was slurried with 100 ml. ethanol and 55 ml. of 3 N aqueous sodium hydroxide solution was added. The material went first into solution but after a few minutes the product crystallized in pale yellow voluminous needles. It was collected by filtration and recrystallized from toluene, M.P. 139°.

EXAMPLE 9

Preparation of 1-(2,3-epoxypropyl)-4-iodo-2-methyl-5-nitroimidazole 10 g. of α-chloromethyl-4-iodo-2-methyl-5-nitro-1-imidazole ethanol was slurried with 20 ml. of alcohol and 10 ml. of 3 N aqueous sodium hydroxide solution was added. The mixture was warmed to 50–60° until all the material had dissolved (3 minutes). Upon allowing to crystallize overnight at 0–5°, the product was recovered by suction filtration, M.P. 99–100°.

EXAMPLE 10

Preparation of 1(3-chloro-2-hydroxypropyl)-2-iodo-4-nitroimidazole 100 g. of 2-iodo-4(or 5)-nitroimidazole, 400 ml. of alcohol and 80 g. of epichlorohydrin were refluxed under stirring for 2 hours. When all the material had dissolved, the solution was poured into 2 liters of water and the product which soon crystallized was filtered by suction. After recrystallization from ethanol, there was obtained pale yellow crystals melting at 161–162°.

The 2-iodo-4(5)-nitroimidazole was prepared from diiodoimidazole according to the following scheme:

125 grams of the crude diiodoimidazole, finely powdered, were added in small portions to a nitration mixture in a three-nick flask of 2-liters equipped with alcohol thermometer and stirrer. The nitration mixture was previously prepared from 300 ml. of nitric acid, d.=1.5 (density) and 300 ml. of concentrated sulfuric acid and cooled to −15 to −25°, preferably in an acetone Dry Ice bath. The addition of the crude diiodoimidazole took about 30–45 minutes. After all the material had been added, the freezing mixture was removed and the reaction mixture allowed to assume room temperature. It was stirred for 2 hours at 20–25° and then poured under stirring into 1.5 liters of ice water. The product precipitated immediately crystalline together with iodine and a slight evolution of $NO_2$. The solid was filtered by suction and washed on the filter twice with 200 ml. of water.

To free it from iodine, it was suspended in 200 ml. of 10 percent sodium iodide solution, stirred for 30 minutes and filtered by suction. It was washed on the filter twice with 100 ml. of water each time and then dried at 60–70° to constant weight. It melts in this state at 275–278° and is sufficiently pure to be used as a starting material for the preparation of subsequent compounds. Recrystallized from dimethylformamide or dilute alcohol, the compound (2-iodo-4(5)-nitroimidazole) melted at 281°.

EXAMPLE 11

Preparation of 1-(2,3-epoxypropyl)-2-iodo-4-nitroimidazole 45 g. of α-chloro-2-iodo-4-nitro-1-imidazole ethanol was slurried with 80 ml. alcohol. 45 ml. of 3 N aqueous sodium hydroxide solution was added under stirring. All the material went first into solution and after several minutes, the product crystallized. After allowing to stand for 5 hours at 0–5°, the product was filtered by suction and recrystallized from alcohol. The product melted at 117°.

What is claimed is:
1. A compound of the formula

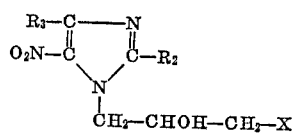

wherein X is halogen; $R_2$ is a member selected from the group consisting of hydrogen, halogen and lower alkyl; and $R_3$ is a member selected from the group consisting of hydrogen and iodine.

2. 1-(3-chloro-2-hydroxypropyl)-2-methyl - 5 - nitroimidazole.

References Cited

UNITED STATES PATENTS

| | | | |
|---|---|---|---|
| 3,043,819 | 7/1962 | Lynn | 260—310 |
| 3,275,649 | 9/1966 | Podesva et al. | 260—309 |
| 3,280,139 | 10/1966 | Klosa | 260—309 |

FOREIGN PATENTS

| | | |
|---|---|---|
| 1,379,915 | 10/1964 | France. |
| 772,830 | 4/1957 | Great Britain. |

OTHER REFERENCES

Drozdov et al., Chem. Abst., vol. 29, col. 2148 (1935), QD 1, A51.

Kutkevicius et al., Chem. Abst., vol. 61, col. 6985–6 (Sept. 14, 1964), QD 1, A51.

Shell Chemical Corp., Epichlorohydrin, pp. 26–31, New York.

HENRY R. JILES, *Primary Examiner.*

NATALIE TROUSOF, *Assistant Examiner.*

U.S. Cl. X.R.

260—999